Patented Oct. 7, 1947

2,428,443

UNITED STATES PATENT OFFICE 2,428,443

CLEANING HIGHLY POLISHED GLASS SURFACES WITH COMPLETELY SAPONIFIED CELLULOSE ESTER TEXTILE MATERIAL

William Whitehead, Rye, N. Y., assignor to Celanese Corporation of America, a corporation of Delaware No Drawing. Application April 28, 1943, Serial No. 484,868

4 Claims. (Cl. 134—6)

This invention relates to the cleaning of highly polished surfaces, and relates more particularly to the cleaning of highly polished glass surfaces, such as those, for example, of lenses, prisms, and the like which are employed in optical instruments.

Optical systems involving the use of lenses and/or prisms are widely employed. Such optical systems form the basis for the operation of innumerable precision instruments such as, for example, bombsights, range finders, aerial cameras, telescopes, binoculars, refractometers, sextants and other navigational instruments, spectrophotometers, pyrometers, saccharimeters, and the like. The accuracy and dependability of these instruments depends to a large extent on the undistorted transmission of light through the optical system. The condition of the surfaces of the lenses and/or prisms in the system is an important factor in obtaining undistorted transmission of light. Dirty, dusty, spotted, greasy or oily lens or prism surfaces may cause serious errors in the accuracy with which said instruments must necessarily operate. Consequently, the maintenance of lens and/or prism surfaces in an absolutely clean condition is essential to the proper functioning of the instruments. Many materials have been proposed for cleaning the surfaces of lenses and/or prisms. Soft flannel, silk, and certain types of tissue paper have been employed, but these materials suffer from certain disadvantages in that they tend not only to shed short fibers or lint but also generate charges of static electricity when rubbed on the glass. When such short fibers are deposited on the glass surfaces, they stick tenaciously thereto due to the static charge and are very difficult, if not impossible, to remove completely. These fibers may comprise just as serious a source of error as the dust or oil which it is desired to remove. Satisfactory methods whereby said glass surfaces may be rendered optically clean and yet remain free of static charges have long been sought.

It is, therefore, an important object of my invention to provide an improved process for the cleaning of highly polished surfaces, particularly the highly polished glass surfaces found in optical systems comprising lenses and/or prisms.

Another object of my invention is the provision of a novel process for the cleaning of highly polished glass surfaces which will leave said surfaces optically clean and free of fibers or lint.

A further object of my invention is to render highly polished glass surfaces optically clean without generating charges of static electricity on said surfaces during the cleaning operation.

Yet another object of my invention is to provide a textile material in a suitable form adapted to be employed in cleaning highly polished surfaces, and especially highly polished glass surfaces.

I have now discovered that the highly polished glass surfaces in optical systems comprising lenses and/or prisms, as well as other highly polished surfaces, may be cleaned without difficulty in a rapid and thorough manner by employing in the cleaning operation a textile fabric, pad or other material comprising continuous filament yarns of regenerated cellulose, which yarns are prepared by the complete saponification of yarns having a basis of an ester of cellulose. The continuous filamentary character of the yarns forming the textile fabric, pad or other material not only eliminates any shedding of individual short fibers but the character of the regenerated cellulose material eliminates other difficulties heretofore encountered in cleaning said surfaces. By employing materials of regenerated cellulose prepared by the saponification of yarns having a basis of an ester of cellulose for the cleaning operation, I have found that little or no static electricity is generated by the rubbing action of the material on the glass, thus leaving the latter at practically zero electrical potential, and the tendency of the surfaces to pick up and retain lint, dust, etc., is thereby substantially overcome. Furthermore, the regenerated cellulose yarns are highly absorbent and, due to the fact that said materials are prepared by saponification processes, all oil, grease, grit, or other foreign material which may be present is removed during this stage in their manufacture, thus leaving the regenerated cellulose textile material in a soft, absorbent and thoroughly clean condition.

The cellulose ester yarns from which the regenerated cellulose textile materials employed in the cleaning process of our invention are made may be prepared in the manner well-known in the art. The cellulose ester, such as, for example, cellulose acetate, is dissolved in a suitable volatile solvent therefor, and the resulting solution may be extruded through an orifice or plurality of orifices into an evaporative medium as in the dry method of spinning, or into a liquid coagulating medium as in the wet method of spinning. Suitable volatile solvents which may be employed are, for example, acetone, acetone and ethyl or methyl alcohol, chloroform, ethylene dichloride, and ethylene dichloride and ethyl or methyl alcohol.

The cellulose ester yarns obtained may be saponified in any convenient manner. The saponification may be carried out as a batch process while the cellulose ester yarns are in package form or may be carried out in a continuous manner. The continuous saponification may be carried out conveniently by leading the cellulose ester yarns directly into a saponifying bath, the path through the saponifying bath being of sufficient length so that the yarn is completely saponified before leaving the bath. After saponification the yarn is washed free of the saponifying agent, dried and wound into packages of convenient size. Alternatively, the yarns may be woven, knitted, netted or knotted into a fabric of any desired weave and the fabric itself subjected to the action of a saponifying bath to yield a fabric of regenerated cellulose yarns. Preferably, the saponification is carried out after the cellulose ester yarns have been woven to form a fabric since, as stated, the saponification tends to remove all grease, oil, or other foreign materials, thus yielding a thoroughly clean fabric ready for use. This eliminates any possibility of contamination which may result when the regenerated cellulose yarns are subjected to a weaving operation.

Any suitable saponifying agent may be employed in carrying out the saponification. The saponifying agent may be inorganic in nature such as, for example, sodium hydroxide, potassium hydroxide, sodium silicate, ammonium hydroxide, sodium carbonate, or other inorganic basic agent. Organic saponifying agents may also be employed such as, for example, methyl amine, ethylene diamine, triethanolamine or other organic bases. The saponifying agents may be employed in varying concentrations in aqueous, alcoholic or aqueous-alcoholic solutions. The saponifying bath may be at a temperature of 20 to 100° C. For example, when aqueous solutions of sodium hydroxide are employed, they may be of concentration of 0.1 to 5% by weight and saponification may be effected in from 30 to 180 minutes with the solution at 30 to 90° C. When employing aqueous solutions of sodium hydroxide as the saponifying medium, it is preferable to have present a salt such as sodium sulphate or sodium acetate in said solution.

Regenerated cellulose yarns possessing a high degree of tenacity are particularly suitable in forming the fabrics or other textile materials employed in the cleaning process of my invention. To obtain said high tenacity yarns the yarns having a basis of a cellulose ester may be subjected to a substantial degree of stretching before being saponified. The yarns may be stretched, after being reduced to a somewhat softened condition by the action of steam or of solvents, latent solvents or swelling agents, to 200, 300, 500 or even 1,000 to 2,000% of their original length. The stretching imparts a high degree of tenacity to said yarns. When these stretched yarns are saponified, their high tenacity characteristic is retained and, in many instances, enhanced by the saponification.

Any suitable cellulose ester may be employed in preparing said yarns from which the regenerated cellulose materials may be prepared by saponification processes. Examples of esters of cellulose which may be employed are cellulose acetate, cellulose propionate, cellulose butyrate, mixed esters, such as, cellulose acetate-propionate and cellulose acetate-butyrate, or inorganic esters, such as cellulose nitrate.

It is to be understood that the foregoing detailed description is given merely by way of illustration and that many variations may be made therein without departing from the spirit of my invention.

Having described my invention, what I desire to secure by Letters Patent is:

1. Process for cleaning highly polished glass surfaces, which comprises subjecting said surfaces to the polishing action of a textile material comprising continuous filament regenerated cellulose yarns prepared by the complete saponification of continuous filament yarns having a basis of an ester of cellulose, whereby optically clean, lint-free and dust-free surfaces at substantially zero electrical potential are obtained.

2. Process for cleaning highly polished glass surfaces, which comprises subjecting said surfaces to the polishing action of a textile material comprising continuous filament regenerated cellulose yarns prepared by the complete saponification of continuous filament yarns having a basis of cellulose acetate, whereby optically clean, lint-free and dust-free surfaces at substantially zero electrical potential are obtained.

3. Process for cleaning highly polished glass surfaces, which comprises subjecting said surfaces to the polishing action of a fabric formed of continuous filament regenerated cellulose yarns prepared by the complete saponification of continuous filament yarns having a basis of an ester of cellulose, whereby optically clean, lint-free and dust-free surfaces at substantially zero electrical potential are obtained.

4. Process for cleaning highly polished glass surfaces, which comprises subjecting said surfaces to the polishing action of a fabric formed of continuous filament regenerated cellulose yarns prepared by the complete saponification of continuous filament yarns having a basis of cellulose acetate, whereby optically clean, lint-free and dust-free surfaces at substantially zero electrical potential are obtained.

WILLIAM WHITEHEAD.

REFERENCES CITED

The following references are of record in the file of this patent:

UNITED STATES PATENTS

| Number | Name | Date |
|---|---|---|
| 2,046,615 | Dreyfus | July 7, 1936 |
| 2,193,894 | Whitehead | Mar. 19, 1940 |
| 2,150,569 | Whitehead | Mar. 14, 1939 |
| 2,053,766 | Dreyfus | Sept. 8, 1936 |
| 2,142,716 | Dreyfus et al. | Jan. 3, 1939 |
| 2,142,717 | Dreyfus et al. | Jan. 3, 1939 |
| 2,142,721 | Dreyfus et al. | Jan. 3, 1939 |
| 1,314,116 | Baillie | Aug. 26, 1919 |
| 1,886,824 | McCormick | Nov. 8, 1932 |